United States Patent [19]

Sung et al.

[11] Patent Number: 5,030,276
[45] Date of Patent: Jul. 9, 1991

[54] LOW PRESSURE BONDING OF PCD BODIES AND METHOD

[75] Inventors: Chien-Min Sung, Northboro, Mass.; Sy-Hwa Chen, Salt Lake City, Utah; Leo Merrill, Orem, Utah; Louis K. Bigelow, Salt Lake City, Utah

[73] Assignee: Norton Company, Worcester, Mass.

[21] Appl. No.: 273,923

[22] Filed: Nov. 18, 1988

Related U.S. Application Data

[63] Continuation-in-part of Ser. No. 95,054, Sep. 15, 1987, abandoned, which is a continuation-in-part of Ser. No. 921,364, Oct. 20, 1986, abandoned, and Ser. No. 61,705, Jun. 11, 1987, abandoned.

[51] Int. Cl.$^5$ .......................... C22C 29/06; B24D 3/02
[52] U.S. Cl. .......................... 75/237; 51/307; 75/239; 75/240; 75/243; 175/329; 419/11
[58] Field of Search ............ 175/329, 412; 76/108 A, 76/108 R; 428/552, 408; 75/237, 239, 240, 243; 419/11; 51/295, 307

[56] References Cited

U.S. PATENT DOCUMENTS

| | | | |
|---|---|---|---|
| 2,210,039 | 8/1940 | Petrie | 51/295 |
| 2,382,666 | 8/1945 | Rohrig et al. | 51/309 |
| 2,941,248 | 6/1960 | Hall | 425/71 |
| 3,356,473 | 12/1967 | Hall et al. | 51/309 |
| 3,464,804 | 9/1969 | Kuratoini et al. | 51/293 |
| 3,609,818 | 10/1971 | Wentorf, Jr. | 425/77 |
| 3,650,714 | 3/1972 | Farkas | 51/295 |
| 3,663,191 | 5/1972 | Kroder | 51/295 X |
| 3,745,623 | 7/1973 | Wentorf, Jr. et al. | 29/95 B |
| 3,841,852 | 10/1974 | Wilder et al. | 51/295 |
| 3,871,840 | 3/1975 | Wilder et al. | 51/295 |
| 3,879,901 | 4/1975 | Caveney | 51/295 |
| 3,924,031 | 12/1975 | Nicholas et al. | 427/217 |
| 3,929,432 | 12/1975 | Caveney | 51/309 |
| 3,938,599 | 8/1976 | Horn | 175/329 |
| 4,063,907 | 12/1977 | Lee et al. | 51/295 |
| 4,063,909 | 12/1977 | Mitchell | 51/309 R |
| 4,104,441 | 8/1978 | Fedeseev et al. | 51/307 |
| 4,108,614 | 8/1978 | Mitchell | 51/295 |
| 4,142,869 | 3/1979 | Vereschagin et al. | 51/295 |
| 4,200,159 | 4/1980 | Peschel et al. | 175/329 |
| 4,224,380 | 9/1980 | Bovenkerk et al. | 428/545 |
| 4,259,090 | 3/1981 | Bovenkerk | 51/309 |
| 4,288,248 | 9/1981 | Bovernkerk et al. | 75/226 |
| 4,374,900 | 2/1983 | Hara et al. | 428/551 |
| 4,378,975 | 4/1983 | Tomlinson et al. | 51/309 |
| 4,399,167 | 8/1983 | Pipkin | 427/217 |
| 4,411,672 | 10/1983 | Ishizuka | 51/309 |
| 4,439,237 | 3/1984 | Kaminitsu et al. | 75/243 |
| 4,440,573 | 4/1984 | Ishizuka | 75/243 |
| 4,491,188 | 1/1985 | Grappendorf | 175/329 |
| 4,499,959 | 2/1985 | Grappendorf et al. | 175/330 |
| 4,527,643 | 7/1985 | Horton et al. | 175/329 |
| 4,529,047 | 7/1985 | Meskin et al. | 175/329 |
| 4,539,018 | 9/1985 | Whanger et al. | 51/309 |
| 4,539,081 | 9/1985 | Whanger et al. | 51/295 |
| 4,593,776 | 6/1986 | Salesky et al. | |
| 4,604,106 | 8/1986 | Hall et al. | 175/329 X |
| 4,608,226 | 8/1986 | Lauvinerie et al. | 175/329 X |
| 4,618,349 | 10/1986 | Hashimoto et al. | 51/307 |
| 4,627,503 | 12/1986 | Horton | 175/329 |
| 4,660,659 | 4/1987 | Short, Jr. et al. | 175/329 |
| 4,667,755 | 5/1987 | Muller et al. | 175/330 |
| 4,699,227 | 10/1987 | Wardley | 175/329 |
| 4,738,689 | 4/1988 | Gigl et al. | 51/295 |

FOREIGN PATENT DOCUMENTS

| | | | |
|---|---|---|---|
| 156264 | 10/1985 | European Pat. Off. | 175/329 |
| 193361 | 9/1986 | European Pat. Off. | 175/329 |

Primary Examiner—Brooks H. Hunt
Assistant Examiner—Ngoclan T. Mai
Attorney, Agent, or Firm—Marmorek, Guttman & Rubenstein

[57] ABSTRACT

An improved temperature stable synthetic polycrystalline diamond (PCD) product includes at least one temperature stable PCD integrally and chemically bonded to a matrix carrier support through a carbide forming layer which is of a thickness of at least about 1 micron, the layer on at least one surface of the PCD is in turn is bonded to the matrix carrier. A wide variety of shapes, sizes and configurations of such products is achieved through relatively low temperature and relatively low pressure processing. Various products of various geometries are described as well as the details of the processing to achieve chemical bonding of the PCD elements in a variety of support matrix carrier materials to form a unitary structure having a temperature stability up to about 1,200 degrees C.

76 Claims, 5 Drawing Sheets

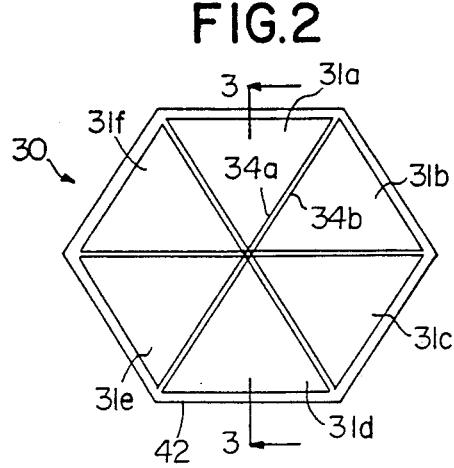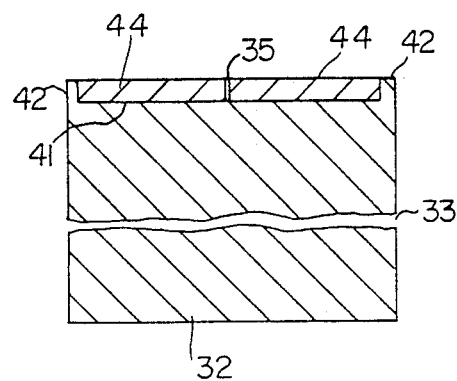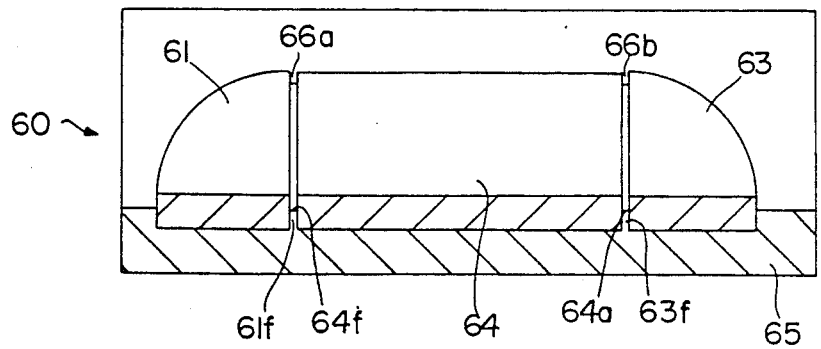

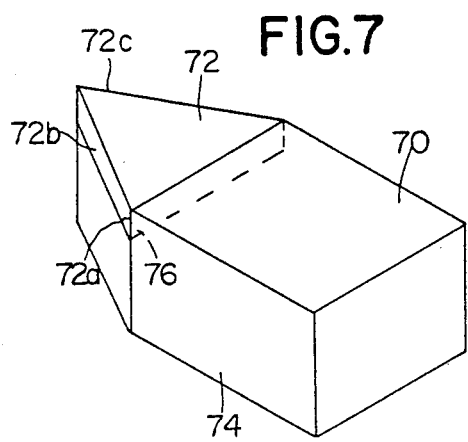
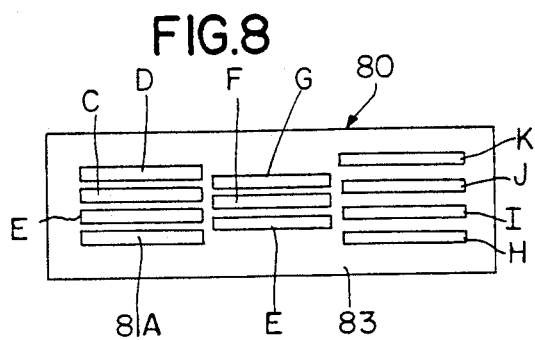
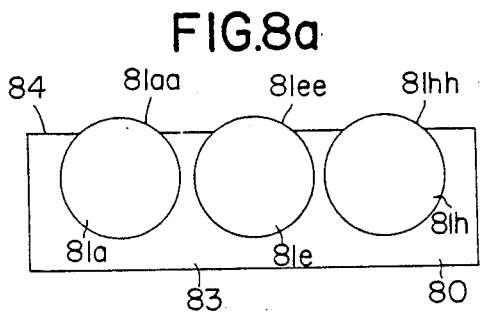
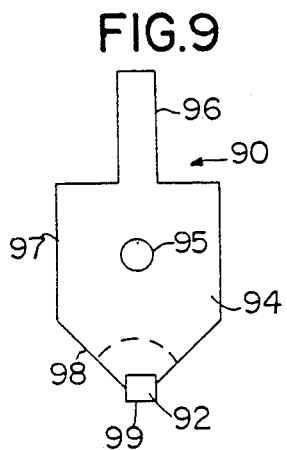
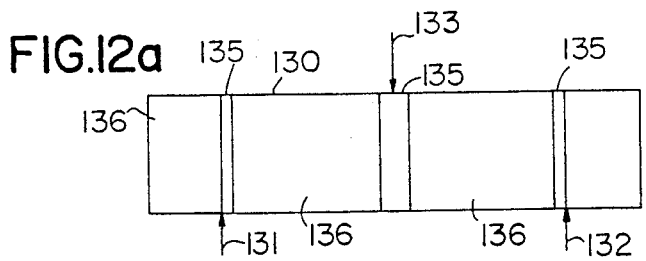
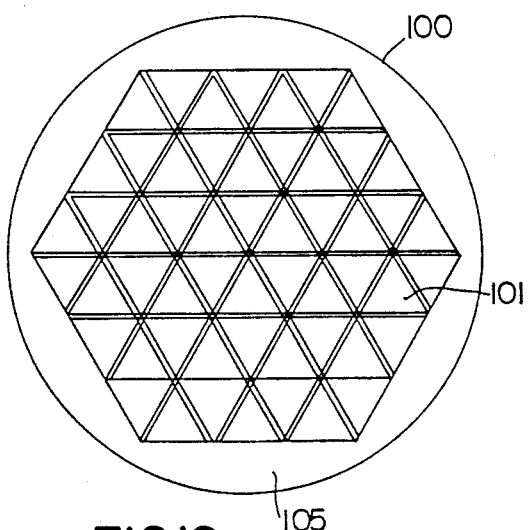
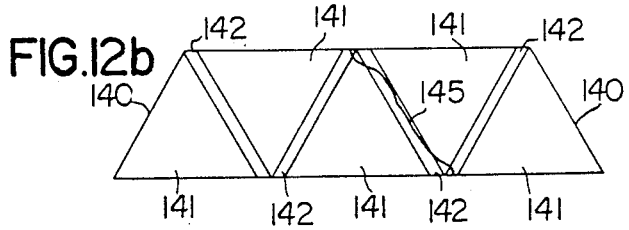
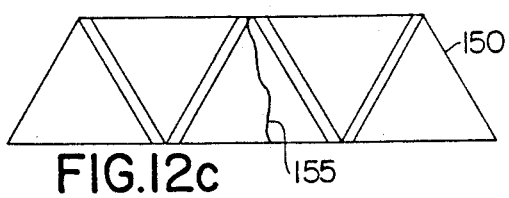
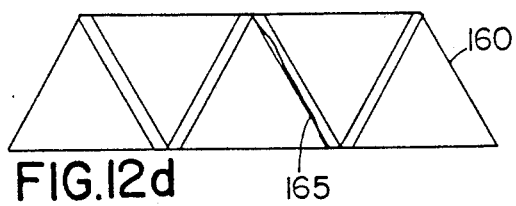

LOW PRESSURE BONDING OF PCD BODIES AND METHOD

RELATED APPLICATIONS

This application is a continuation-in-part of application Ser. No. 095,054, filed Sept. 15, 1987, now abandoned, which is a continuation-in-part of application Ser. No. 06/921,364, filed Oct. 20, 1986, now abandoned; and application Ser. No. 061,705, filed June 11, 1987, abandoned, all of which are assigned to the present assignee.

FIELD OF INVENTION

The present invention relates to an improved synthetic diamond product and method of making the same and more particularly to an improved and novel temperature stable diamond assembly which may be of a variety of sizes, shapes, and thickness, the diamond assembly being formed by an improved and novel bonding method which does not require the comparatively high temperatures and pressures normally used in the synthesis of synthetic diamond products thus to provide a diamond assembly which may be relatively large and in which the diamond, preferably in the form of a temperature stable synthetic polycrystalline diamond, is firmly and chemically bonded on or to a support structure.

BACKGROUND OF THE INVENTION

Various types of synthetic diamond products are known and commercially available. Typically such products are used industrially for material removal purposes, for example, drilling products such as core bits, mining bits, drilling bits for oil and gas, saw products, cutting tools, grinding wheels, and products such as wire-drawing and extruding dies, bearing surfaces, dressers, lead bonding tools and abrasives.

These synthetic diamond materials may vary somewhat in their character, one being an unleached polycrystalline product having a temperature stability of up to about 700-750 degrees C., see U.S. Pat. Nos. 3,745,623 and 3,609,818. This synthetic diamond product itself is usually formed by diamond-to-diamond bonds and is carried on a substrate which may be cemented tungsten carbide, for example. The substrate is usually preformed and contains cobalt, the diamond product being formed and affixed to the substrate at very high temperatures and pressures, usually referred to as the diamond stable region of temperature and pressure, as set forth in prior patents and other literature, and typically above 50 kbar and at a temperature above about 1,200 degrees C.

These products are often referred to as polycrystalline diamond products (PCD) as contrasted to single crystal diamonds. PCD elements offer the advantage that upon fracture, only a relatively small fragment of the PCD element is lost as compared to a single crystal diamond in which fracture takes place along a plane with the possibility of losing a relatively large piece of the diamond.

Unleached PCD elements may be formed with the high temperature and high pressure apparatus as disclosed, for example, in U.S. Pat. No. 2,941,248. PCD products thus far described are available in various sizes and shapes, for example circular, half-circles, quarter round, square, rectangular, half-rounds with a pointed section, and the like. The PCD face or disc, joined to a backing member of tungsten carbide or the like is sometimes mounted, by brazing, on a steel tool body or tungsten carbide slug support. The PCD materials may be as small as several millimeters to as large as 50 millimeters in diameter, see for example U.S. patent application Ser. No. 906,169, filed Sept. 11, 1986, and assigned to the same assignee (CHP 6149).

Inclusions such as cobalt, iron or nickel present in unleached PCD elements as residual materials initially used as solvents/catalysts in the synthesis of the PCD tend to reduce the temperature stability of the PCD to well below 1,200 degrees C., for example, to about 750 degrees C.

The fabrication of the larger diameter materials requires rather large and expensive processing equipment capable of generating high pressures and temperatures. The temperatures and pressures are those in the diamond forming region of the phase diagram for carbon, see for example U.S. Pat. Nos. 4,108,614 and 4,411,672. The length of the substrate or backing is a limitation since the processing equipment must be capable of fabricating a diamond facing on a rather long piece which takes up room in the press. The result is that in at least one instance, the length of the backing, axially to the rear of the PCD face, is rather short and after formation, a longer tungsten carbide member or member of other material is attached to the formed product by any one of several well known procedures, and as described in U.S. Pat. No. 4,200,159, for example.

In one typical use of these products, for example in oil and gas drilling bits and core bits, the usual practice is to form the bit body and thereafter to mount the PCD cutting element in the bit body. The bit body may be steel and the PCD cutter is a slug type cutter which is press fitted into apertures in the bit body. A difficulty with the use of steel bodies is that the body may be subject to erosion by the relatively abrasive flow of the drilling fluid used to clean and cool the bit. Thus, the practice has been to hard face the steel body.

In the case of matrix body bits which offer erosion resistance, the practice has been to mount the slug type PCD cutter by brazing the cutter to the matrix body. One of the problems associated with this procedure, in addition to the increased cost, is the desire to use a relatively high temperature braze material and the need to keep the PCD face cool to prevent thermal damage (above about 750 degrees C.) to the cutter face during the brazing operation. Even so, a large number of bits have been made as described by a variety of bit manufacturers.

Another commercially available form of PCD, sold under the mark GEOSET, is an unbacked leached product, see U.S. Pat. Nos. 4,224,380 and 4,288,248, which has a temperature stability of up to 1,200 degrees C., but which may have a porosity of up to about 15% and may not be as impact resistant as desired in a particular application. The temperature stability of these PCD products offers the advantage that they can be exposed to the relatively high temperatures used during the infiltration procedure used to form the bit body without degradation of the PCD, thus eliminating the need for brazing. In general, temperature stability is also an advantage in the cutting action of the PCD during use. For the purposes of this invention, temperature stability means that the PCD element, regardless of type, is stable to about 1,200 degrees C. without significant deterioration in its properties and will be referred to herein as TSPCD.

Temperature stable PCD elements are known which are not porous and are not leached. A typical such material, available under the trademark SYNDAX-3 is a PCD in which silicon is present in the form of silicon carbide.

Significantly, the TSPCD materials are not commercially available as backed products, as contrasted to the previously described low temperature products. The TSPCD materials are available as unbacked materials in a wide variety of shapes and sizes and they may be cut to form additional shapes by using a laser or other means.

While temperature stability is not required in all uses, there are many applications in which it is required. Further, there are processing steps such as brazing in which the PCD part may be exposed to temperatures above 750 degrees C. In these instances it is necessary to cool the PCD part or to otherwise prevent it from being exposed to the higher temperature. As a result, there are limitations in the processing of such unstable PCD products which tend to limit the use thereof.

TSPCD elements, are available in a limited range of sizes that are generally too small for individual use in many applications. To overcome this problem, TSPCD elements have been formed into a mosaic type of structure in which the individual TSPCD elements are mounted and mechanically affixed in a support structure, e.g., a hot-pressed segment or the like, see U.S. patent application Ser. Nos. 797,858; 794,569 and 797,445, filed respectively on Nov. 14, 1985, Nov. 4, 1985 and Nov. 13, 1985, and all assigned to the same assignee as this application.

While these mosaic structures have been operated satisfactorily and provide a large PCD cutter having temperature stability, the mosaic elements lack the advantages of the large one piece PCD cutters (up to 50 mm diameter or more) which are not temperature stable but which have been used in oil and gas drill bits and core bits. Even though the bits using the mosaic cutters avoid the necessity of having to braze the mosaic into the matrix of the bit, the mosaic cutters do not function as a large one piece PCD since the individual mechanically mounted TSPCD elements can be broken free of the supporting structure. A mechanical type of mounting also limits the shape and size and contour of the cutter, even though the assembly is temperature stable.

Another problem with known mosaic cutters is that bending stresses tend to cause release of the mechanically mounted TSPCD elements. Moreover, unlike a large integral brazed PCD cutter of the same size in which only small portions of the PCD are fractured off during use, the tendency in the mosaic cutters is to release entire TSPCD elements as the supporting structure around the TSPCD is abraded away and support for the TSPCD is reduced, i.e., the individual TSPCD element is lost rather than losing only a small fragment.

In general there is a need for a TSPCD containing product in which one or more TSPCD elements are firmly anchored or locked into or mounted on a suitable support, which optionally may be mounted to another structure. It is desirable to mount one or more of such TSPCD elements by more than merely a mechanical mounting, and preferably it is desired that the mounting be by a firm chemical bond.

U.S. Pat. No. 3,650,714 of Mar. 21, 1972, issued to Farkas, describes a method for coating natural single crystal diamond particles in the range of 200 to 250 mesh with either titanium or zirconium. The coating is applied from dry powder, the resultant material is then heated in a graphite mold, under vacuum conditions for between 10 to 15 minutes at a temperature in the range of 850 to 900 degrees C. The relatively low temperature of heating to form a carbide at the interface indicates that the titanium or zirconium coating is quite thin. The result is said to be a coated diamond particle in which the coating is about 5% by weight of the resultant product and in which a carbide is formed at the interface, with the outer surface of the coating being non-carbided. The calculated thickness of the coating is about 0.445 of a micron for 200 mesh material and 0.344 of a micron for 250 mesh material. Since subsequent processing in an oxidizing atmosphere would result in the formation of an oxide which is not easily wetted by other materials, the coated natural diamond particles are overcoated with either nickel or copper with a film thickness of between 0.002 and 0.005 of an inch (between 50.8 and 127 microns thick). This outer coating is said to serve as a protective coating to prevent oxidation of the titanium or zirconium or their carbides during subsequent processing under oxidizing conditions. The subsequent processing described is hot or cold pressing and subsequent sintering or infiltration with brazing alloys.

An important difficulty with the above procedure and the resulting product is that the carbide containing coating is quite thin, substantially less than one micron, with the result that under certain types of subsequent processing such as with the use of liquid binders in infiltration, as for example in the formation of an infiltrated matrix for earth boring bits, the liquid binder penetrates the protective coating and the relatively thin carbide containing coating. The problem would be particularly acute with PCD elements since their surface is rather "rocky" and irregular and includes a certain amount of surface porosity. Thin coatings such as described in Farkas would contain substantial imperfections and voids that would permit the liquid infiltrating binder to attack the carbide interface between the PCD and the coating and to separate the coating from the PCD. In addition, the processing of such coated diamonds, whether PCD elements or natural, in an oxidizing atmosphere is not practical since any imperfection or dissolution of the outer nickel or copper coating, for instance by the action of the liquid binder, would result in the oxidation and destruction of the underlying titanium and titanium carbide layer.

Also known in the prior art are products which might be generically referred to as diamond impregnated products. Typically these products are composed of natural or synthetic diamond particles which may be of a variety of mesh sizes. Whereas a large integral PCD element may be between 70% and 97% by volume of diamond material, depending upon the processing, the amount of residual inclusions or porosity, the impregnated products generally have a much lower volume percent of diamond, typically less than 40%. The result is that the impregnated product performs better as an abrasive or cutting element than does the same material without the diamond grit, but the problem is that the small diamond particles are easily lost as the surrounding supporting structure is abraded away. To improve the retention of the diamond grit in the supporting structure it has been proposed to coat the particles of the grit with various metals such as tungsten, tantalum, columbium, niobium or molybdenum, and the like by chemical vapor deposition techniques using a fluidized bed procedure, see for example U.S. Pat. Nos. 3,871,840 and 3,841,852. The products there described are about 25% by volume of diamond grit of particle size from 40 to 100 mesh and represent an improved impregnated product in contrast to an improved large diamond product. The coated diamond grit is formed into various shapes by a hot pressing procedure or by infiltration at an elevated temperature.

Coatings have also been used to form diamond products as contrasted to impregnated products. For example, U.S. Pat. No. 3,879,901 describes the vacuum deposition of a metal such as molybdenum or titanium on diamond materials with subsequent processing at 60 Kbar and between 1,200 and 1,400 degrees C. to form a diamond product. In another instance, see U.S. Pat. No. 4,378,975, an abrasive body with diamond is formed by forming a green body by cold pressing with a nickel based alloy. The green body is then sintered at 950 degrees C. with a diamond volume of between 10% and 40% by volume.

It is also known in the sintering of synthetic diamond to use a thin coating of between 300 and 6,000 Angstroms of a strong carbide former, with a second coating of copper with subsequent processing at 5 Kbar at a temperature of 600 to 700 degrees C. in an inert atmosphere, see U.S. Pat. No. 3,356,473. In U.S. Pat, No. 3,464,804 it is proposed to form a chemically bonded coating of titanium such that a titanium-carbon bond is formed followed by processing at 62,000 atmospheres of pressure.

In general, the coating procedures of the prior art are related to pretreatment of diamond forming materials which are thereafter processed at relatively high temperatures and pressures to form a diamond element or to form a coating on diamond grit used to form an impregnated product in which the volume of diamond is well below about 50% by volume.

The provision of improved methods for the fabrication of large TSPCD products, which are temperature stable in the range of about 1,200 degrees C. and which may be fabricated at lower pressures and temperatures than have been used in the synthesis of diamond products, would have unique advantages. For example, the cost for fabrication equipment is vastly reduced as well as the cost for each of the products. The ability to fabricate various shapes and sizes and thickness, i.e., to be free of the shape and size limitations of high-temperature and high pressure equipment, would also offer advantages from a processing and application point of view.

One of the significant advantages of the present invention is the ability to fabricate a TSPCD product of a particular configuration and in which the TSPCD starting element or elements are firmly anchored in place on a matrix backing. The term "matrix" is used to describe the powder and binder material which is placed around or in contact with the TSPCD element and which is processed in accordance with this disclosure. As will be described, this matrix may, for instance, be formed either with a highly compacted ceramic powder, sometimes referred to as a "matrix carrier", such as might be used as a cutter for an earth boring bit, or with a non-compacted ceramic powder, such as might form the body of an earth boring bit. In either case, the final matrix is formed by infiltration with a molten binder alloy or by solid state sintering.

BRIEF DESCRIPTION OF THE INVENTION

In accordance with the present invention, a TSPCD product is provided which is fabricated from a single or a plurality of TSPCD elements by improved low pressure and low temperature procedures. The TSPCD product comprises one or more TSPCD elements coated with a carbide forming metal and bonded to a matrix. Each TSPCD element is chemically bonded to an inner carbide layer of the metal coating, and the metal coating is chemically bonded to the matrix.

The metal coating comprises a carbide forming metal, preferably one which is stable against oxidation during processing. The preferred metal coatings are the refractory transition metals, especially tungsten, tantalum or molybdenum, and most preferably tungsten. Less preferably, a double layer coating such as tungsten/titanium or tungsten/chromium or nickel/titanium may be used. The metal coating should be at least 1 micron in thickness and preferably 3 microns thick. Maximum bond strength is obtained with coatings between about 10-30 microns. A carbide layer between the TSPCD and the metal coating chemically bonds the coating to the TSPCD. The outer portion of the coating remains metal, which is chemically bonded to a matrix material.

A particular advantage of the present invention is the ability to form a product made up of a plurality of TSPCD elements that act as a single larger TSPCD element bonded to a backing.

In general, the method of the present invention includes the steps of coating one or more TSPCD elements with a carbide forming metal, assembling the coated TSPCD element in a mold with a powder of the matrix material, such as powdered tungsten carbide, and bonding the TSPCD to the matrix material by liquid infiltration with a binder alloy or by solid state sintering.

If the matrix is to be compacted to form a matrix carrier, the assembly of the coated TSPCD and the matrix powder can be cold pressed to compact the powder to about 50 volume percent. The thus pressed assembly may then optionally be cold isostatic pressed to further increase the volume percentage of the powder to about 60-65 volume percent. The cold isostatic pressed part has sufficient integrity to be handled and machined, if that is needed. If the matrix is to form the body of a tool or drill bit the compacting steps are generally not necessary.

Preferably, the carbide layer is formed simultaneously with the liquid infiltration or solid state sintering step. However, the coated TSPCD can be first heated in a vacuum, inert or reducing atmosphere under carbide forming conditions, i.e., at temperatures above about 900 degrees C. to form the carbide inner layer before being placed in the mold with the matrix powder.

The term "chemical bond" is used herein to refer to the strong bonds that are formed between the diamond and the metal coating through the medium of the carbide layer at the interface, and between the exterior surface of the metal coating and the matrix carrier. While not fully understood, it is believed that the former is an atom to atom level bond between the carbon of the diamond and the carbide layer. The latter is believed to be a metallurgical bond in which the binder alloy used in the liquid state infiltration or with the sintered material of the matrix if solid state sintering is used. This contrasts sharply with the mechanical bonds that were formed in the prior art systems.

The term "diamond product" used herein and in the claims includes cubic boron nitride.

The methods described above permit the formation of a wide variety of shaped cutting elements for use in various cutting and abrading devices. In general, however, the principal advantage of this invention is the ability to provide a TSPCD structure in which one or more TSPCD elements are firmly anchored in a support structure by a bond which is significantly stronger than a mere mechanical mounting. One important result is that the assembly of several TSPCD pieces in the form of a predetermined pattern results in the part acting as one large TSPCD element rather than as a plurality of TSPCD elements held together as an aggregrate.

BRIEF DESCRIPTION OF THE DRAWINGS

FIG. 2 is a plan view of one form of a TSPCD product in accordance with the present invention;

FIG. 3 is a side view as seen along the line 3—3 of FIG. 2;

FIG. 4 is an enlarged fragmentary view illustrating the bonding path between adjacent TSPCD elements in accordance with this invention;

FIG. 5 is a view in perspective of a TSPCD product having a single TSPCD element in accordance with this invention;

FIG. 6 is a plan view of one form of bearing in accordance with this invention;

FIG. 6a is a sectional view taken along the line 6a—6a of FIG. 6;

FIG. 7 is a view in perspective of a dressing tool in accordance with the present invention;

FIG. 8 is a plan view of a saw blade segment in accordance with this invention;

FIG. 8a is a sectional view as seen along the line 8a—8a of FIG. 8;

FIG. 9 is a sectional view of a lead bonding tool in accordance with this invention;

FIG. 10 is a plan view of a TSPCD product in accordance with this invention in which a multiplicity of individual elements is bonded together into a larger TSPCD structure;

FIGS. 12a to 12d are diagrammatic views of various structures and the test protocol for three point testing;

DETAILED DESCRIPTION OF THE INVENTION

In accordance with this invention, the starting diamond material is preferably a TSPCD element composed of aggregate diamond particles having a size in the range of submicron to over 100 microns, for example, although the particle sizes need not be uniform; i.e., mixtures of particles of the sizes indicated may be used as is known in the art. The TSPCD should contain at least 60% by volume of diamond aggregates, and the product may be leached or unleached with diamond to diamond bonding or diamond to metal bonding in the assembly. For products to be used in cutting or abrasive operations where the surface finish of the cut or abraded part is important, it is preferred that the smaller particles of diamond be used, for example, below about 15 microns. By way of example, wire drawing dies may require smaller particle sizes in order to provide a certain surface finish on the drawn wire product.

The TSPCD element may be as small as 250 microns, (i.e., 10 mils) on an edge and as large as one carat or more. It is preferred that the edge length of the starting TSPCD be above 1,000 microns (i.e., one millimeter) since pieces of this size are easier to manipulate or handle. Typically, TSPCD elements of a size of three pieces per carat (0.165 of an inch per side triangles) are easily handled.

In some instances the smaller particle sizes of TSPCD material below 250 microns may be used as a grit in the material used to bind the larger TSPCD elements described in order to provide an impregnated support or to increase the amount of diamond material between adjacent larger TSPCD elements.

It is preferred that the TSPCD starting material be of a regular geometrical shape which may be any of the shapes already mentioned. The principal reason for a fixed and known geometrical shape is that it simplifies the arrangement of the TSPCD elements in the desired relationship for processing and thus offers maximum control of placement, spacing and overall configuration and content of the final part. Since one of the advantages of the present invention is the ability to form large TSPCD structures, it is also preferred that the geometrical shape be such that the TSPCD starting elements have side surfaces or faces which can be positioned in a close and controlled spacing to an adjacent TSPCD element, e.g., triangular, square, rectangular and the like, it being understood, as will be discussed in detail, that a TSPCD structure may include TSPCD elements of different geometrical configurations.

Figure 1:
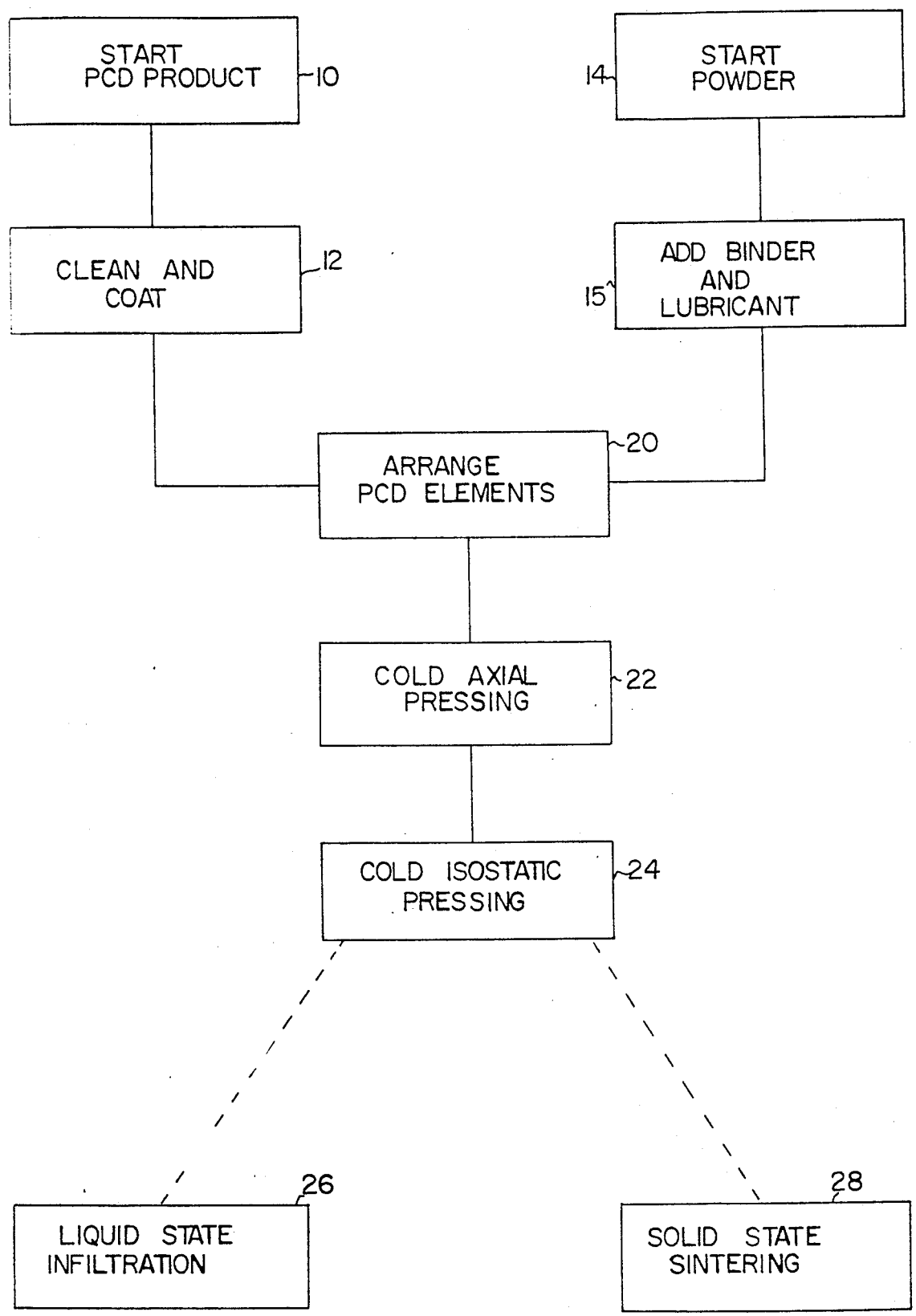
FIG. 1 is a flow chart depicting the steps in formation of a TSPCD product in accordance with the present invention.

In the processing in accordance with this invention, as diagrammatically illustrated in the flow chart of FIG. 1, the starting TSPCD material 10 is preferably cleaned by heating in hydrogen at about 800 to 1,000 degrees C. for about 10 to 60 minutes as indicated at 12. Other cleaning procedures may be used provided they are effective to remove oxidants and other surface contaminants. Thereafter the cleaned TSPCD material is surface coated with a metal by any one of several known procedures to form an essentially continuous coating which is essentially free of discontinuities. For reasons which will become apparent, the presence of discontinuities in the coating tends to promote lifting of the carbide containing coating off the surface of the TSPCD or provide a defect through which other materials may migrate to adversely affect the underlying TSPCD.

One such coating procedure is chemical vapor deposition by which a metal compound such as a chloride or a fluoride is heated to decompose the compound to form a mist of the metal which then deposits on the TSPCD material. Another procedure is fused salt bath coating methods.

The preferred carbide forming metals for the coating are the refractory transition metals, particularly tungsten, tantalum and molybdenum. Less preferably, the TSPCD element may also be double coated such as with tungsten/titanium, tungsten/chromium or nickel titanium. The use of a two layer coating increases expense and the use of oxidation sensitive metals, such as titanium, requires special process conditions. Tungsten is most preferred as the coating metal because it is a strong carbide former, not subject to excessive oxidation damage, has similar thermal expansion characteristics as the TSPCD elements, and is not easily dissolved by the liquid binder metals during later processing. Other less preferred metals that may be used in a given application are the other ones of the Group IVA, VA, VIA, VIIA metals and alloys and mixtures thereof and silicon, such as titanium, niobium, vanadium, zirconium, manganese, molybdenum/manganese, or tungsten/manganese. These materials have a melting point higher than the temperatures used in subsequent processing and are strong carbide formers and form a strong bond to the diamond. Metals of Group VIIIA, such as cobalt, iron and nickel are less preferable because of the tendency to weaken the TSPCD by back conversion of the diamond or possibly by other means. Zirconium and titanium have been observed to have a volume expansion in response to elevated temperatures which is more than that of diamond but less than that of cobalt and iron, but these materials are subject to oxidation damage in subsequent processing in normal atmospheres unless protected by an overcoating of nickel or copper or some other material. Even so, care must be taken to assure that the carbide containing coating is sufficiently thick to prevent penetration by the surrounding metal should the copper or nickel or other coating dissolve into the matrix carrier.

For chemical vapor deposition, one may use the hexahalides, tetrahalides, pentahalides, e.g., the hexa-, tetra- and penta-forms of the bromides, chlorides fluorides of the metals mentioned. The thickness of the coating on the TSPCD element should be at least 3 microns and preferably in the range of about 10 to 30 microns. Thicker coatings may be used but do not seem to increase the bond strength over that achieved in the range of about 10 to 30 microns. In the case of tungsten, a thinner coating, at least 1 micron in thickness may be used in certain less demanding applications because of its stability and wetting character.

The application of the coating does not necessarily result in a chemical bond to the TSPCD at this point in the processing. As near as has been determined, the processing temperature used in chemical vapor deposition is not sufficiently high to form a chemical bond as indicated by the essential absence of any diffused carbon into the metal of the coating and the absence of any metal of the coating being diffused into the TSPCD. While it is believed that the coating is essentially uniform in dimension and essentially covers the entire outer exposed surface of the TSPCD, it is not essential to form an absolutely continuous coating. In the case of porous leached TSPCD elements, the coating should be thick enough to bridge over the pores in the TSPCD surface so that it is effectively coated with the metal.

The carbide layer may be formed either by heating the coated TSPCD elements under carbide forming conditions either before being assembled with the matrix forming materials or simultaneously with the formation of the matrix by infiltration or sintering. In either case the heating is controlled to promote formation of a relatively thin carbide layer on that portion of the surface of the TSPCD which has been coated by the carbide former. During the controlled heating, under carbide forming conditions, carbon diffuses from the PCD into the coating to form a carbide. The thickness of the carbide layer is thinner than that of the coating and less than 10 microns and preferably less than 5 microns.

During the heating, it is believed that the temperature used to form the carbide is more important than the rate of heating. The evidence suggests, in the case of a tungsten coating for example, that the coating on the diamond can form a carbide above about 950 degrees C. and preferably at about 1,100 degrees C. no matter how fast the heating is conducted. Thus, heating at 1,100 degrees C. for about 15 minutes is normally sufficient. A longer time of heating at 1,100 degrees C. can increase the thickness of the carbide, but in general longer heating periods at high temperatures may damage the diamond because of too much carbide formation and results in an ineffective chemical bond being formed. Heating at 1,200 degrees C. for one hour has been used effectively where the carbide layer is formed simultaneously with the bonding of the coated TSPCD element to the matrix of a drill bit during the infiltration of the matrix. A vacuum of 10 to the minus 6 torr. or a protective atmosphere may be used during heating but is not required in all cases. Coatings of less than 1 micron result in unacceptable separating of the coating from the TSPCD element during infiltration or sintering. The resulting TSPCD element has an outer surface coating of the metal chemically bonded to an intermediate carbide layer, which in turn, is chemically bonded to the base TSPCD.

When a tungsten coated TSPCD element is furnaced in a graphite mold or oxidative environment, the tungsten is relatively stable against oxidation as compared to titanium, for example, unless the titanium is protected by an overcoating. In addition to the above noted problems with titanium and double coatings, if the overcoating is not continuous, for example if there are defects which expose portions of the underlying oxidation sensitive coating, subsequent processing in an oxidizing environment may destroy the metal and the carbide interface or a local portion of the underlying diamond material or both. There are some types of matricies which tend to dissolve the oxidation protective layer with the result that a gap tends to form between the partially oxidized carbide former coating and the surrounding structure, resulting in a marked reduction in the strength of the bond between the coating and the surrounding structure. Ideally, the bond between the outer surface of the coating and the matrix carrier is a metallurgical bond which is not easily formed if the coating is not of compatible material or if it is oxidized.

An important advantage of this invention is the ability to form a backing or supporting structure for the TSPCD elements of widely varying configuration and composition. The backing is formed in situ as the TSPCD elements are bonded chemically together and to the matrix support structure.

In the case where the TSPCD element or elements are to be bonded to a matrix carrier, it is preferred to compress the powder and the TSPCD elements in an axial compression operation. Ultimately the backing or support structure will achieve a volume percentage of metal and/or metal carbide and/or abrasive particle (e.g., oxides or non-metal carbides) which is in the range of 40% to 80%. Optionally, the compacted structure may be further compressed by isostatic pressing in which the volume percentage is increased to about 60% to 90%. If the structure is to be sintered, isostatic pressing is preferred.

The hard ceramic powders used to form the matrix carrier may be a metal carbide such as tungsten carbide, titanium carbide, tantalum carbide, molybdenum carbide, and cemented tungsten carbide (tungsten carbide cemented with cobalt). Alternatively, it could be made of other hard ceramic powders such as alumina or titanium or silicon nitride. The abrasive particles may be alumina, silicon carbide or silicon nitride. For applications such as earth boring bits, where strength and toughness are important, tungsten carbide is the preferred hard ceramic powder.

The particular powder used and the particle size or sizes is related to the desired volume percent of the matrix powder, the final product which in turn is related to the hardness (rigidity) and impact resistance (toughness) of the backing or support structure. Also a consideration is the type of processing, e.g., liquid state infiltration or solid state sintering.

In the case of liquid state infiltration, the hard ceramic powder, for example tungsten carbide, has a particle size which is typically below 325 mesh (Tyler), i.e., below 44 microns (Standard), for example 30 microns. The size distribution and the percentage distribution may vary depending upon the supplier. However, the size may also be varied. For example the same packing efficiency may be obtained by appropriate selection of particle sizes, e.g., 30 microns and 6 microns in a ratio of 70% to 30%.

A preferred infiltrating material is a copper-tin-nickel-manganese alloy. If the alloy does not include manganese or nickel, thinner coatings of about 1 micron may be used, as will be discussed.

In the case of solid state sintering, for example, using a tungsten powder, the powder particles are preferably coated with a metal such as nickel, for example 0.35 weight percent. This may be done, for instance, by mixing tungsten powder of a particle size of 0.5 microns with a solution of nickel nitrate in alcohol, followed by heating at about 90 degrees C. to evaporate the alcohol with the result that the nickel nitrate is deposited on the tungsten powder. The nickel nitrate coated tungsten powder is then heated at about 800 degrees C. for about 3 hours in a reducing atmosphere (hydrogen) to eliminate the nitrate. The processed tungsten powder is then ball milled for about 24 hours using tungsten rods as the milling media and then sieved and screened to 200 mesh (74 microns). The purpose of the nickel is to act as a diffusion activator for the tungsten. Other binder materials which may be used are tantalum, molybdenum, and nickel based alloys, copper-nickel alloys and cobalt based alloys. In either liquid state infiltration or solid state sintering, the appropriate powder of the appropriate particle size or sizes is mixed with a temporary binder material which is preferably an organic material as indicated at 15. The temporary binder is used to coat the powder material to form a temporary adhesive bond between the powder particles during the initial compression step. Since this temporary binder remains in the processed product through the cold isostatic pressing operation, it should preferably be a material which is present in a relatively low volume percentage. If the volume percentage of the temporary binder needed to achieve a temporary bond is too high, this may affect the volume percentage of the powder in the final product, i.e, too great an amount of the temporary binder may prevent the achievement of higher powder volume percentages. Various organic polymeric or resinous binders which are easily volatilized at elevated temperature may be used. A preferred material is paraffin which is easily dissolved in an organic solvent. The amount of paraffin relative to the tungsten carbide is about 2 weight percent. The paraffin is easily and completly removed in the processing. It is also desirable to use a lubricant which may be volatilized completely at elevated temperatures in order to facilitate powder movement during the various pressing operations, especially the optional cold isostatic pressing operation. One such material is mineral oil which may also be dissolved with the temporary binder to coat the powder. A typical useable amount is 20 grams of paraffin per 1,000 grams of cast carbide in 0.2 grams of glycerine per 1,000 grams of cast carbide, by way of example.

The powder is dispersed into the solution of the temporary binder and lubricant in hexane (for the paraffin) and the binder and lubricant coat the powder which is then dried and reground into a powder. Other coating procedures may be used as is known in the art.

The next step in the sequence, as indicated at 20, is to arrange the coated TSPCD elements in the desired relationship as needed to form a product. If the product is to contain multiple TSPCD elements it is preferred to use a template or die configured to position the TSPCD elements with respect to each other. The spacing between adjacent TSPCD elements may vary widely, depending upon the configuration and nature of the final product. Where the part includes multiple TSPCD pieces, the side faces of the TSPCD elements may be spaced from each other to provide a gap of from about less than 1 mil to 500 mils and preferably in the range of 6 to about 30 mils (150 to 750 microns), by way of example. Thereafter, the processed powder is placed in the gaps between the adjacent TSPCD pieces and filled in in contact with the surfaces of the TSPCD elements to be bonded to the matrix carrier.

In some instances it is not necessary to form a gap as described since the TSPCD may be assembled with adjacent surface portions in contact with each other. In this instance, where liquid state infiltration is used, the binder penetrates between the TSPCD elements and chemically bonds the adjacent coated TSPCD elements together. Such a butting arrangement of the TSPCD's may be used where erosion is not a potential problem, e.g., in bearings, saw blades and wire dies and the like, for example. Where erosion is likely to be a problem, such as exposure to relatively high velocity flow or the use of abrasive materials, the use of a gap in which powder is present is preferred for erosion resistance.

The thus assembled TSPCD-powder temporary assembly is then assembled into a pressure die of suitable configuration which preferably defines the outside contour of the finished part. One manner of carrying this out is to use an open ended die, invert the die and move the temporary assembly of TSPCD elements up into the bottom of the die, re-invert the die right side up so that the assembly is in the bottom of the die and then add the processed powder material to the required volume. The amount of powder added is related to the thickness of the support or backing and the volume percentage of the metal in the final product.

The assembled material is then axially cold compressed in the die, as indicated at 22, at a pressure of between 10,000 psi and 30,000 psi to increase the tungsten carbide packing density to about 50 to 65 volume percent. As a result of this processing, a compacted intermediate is formed which is fragile but still capable of being handled with care. As another example, if the subsequent processing is solid state sintering, pressures around 10,000 psi may be used and the resultant product has a packing density of about 50 volume percent.

An additional step in the processing is the cold isostatic pressing operation, as shown at 24, in which the compacted intermediate is isostatically cold pressed at a pressure of up to about 30,000 psi for five minutes or longer, for example. The isostatic pressing typically achieves a tungsten carbide packing density of about 62 volume percent. In the case of tungsten powder in solid state sintering, the density is about 65 volume percent. During this operation, the tungsten or the carbide powders are moved and compacted uniformly to a more dense product. The step of cold isostatic pressing is optional although in many cases it is preferred particularly for sintered products.

At this point in the processing, two alternate processing routes are available, as indicated in the dotted lines of FIG. 1, liquid state infiltration, as seen at 26 or solid state sintering as seen at 28.

In the case of solid state sintering, the product of the isostatic pressing is sintered in a vacuum furnace at 10 to the minus 5 torr. at 1,200 degrees C. for about 1 hour. The result is a sintered product having a density of about 90 volume percent. The finished product indicates a bond between the tungsten material with the tungsten coating on the TSPCD, i.e., a tungsten-tungsten metal bond. The nickel or other activator is used to promote diffusion and metallurgical bonding. The mechanical properties of this bond are quite strong, and the finished product, although somewhat brittle is quite useable.

There are, however, some limitations of solid state sintering. For example, the limitation of sintering at a temperature below 1,200 degrees C. renders it difficult to find a material with high strength and high modulus. Even if the high modulus materials can be sintered below about 1,200 degrees C., as by activation sintering, the sintered product may contain 5% or more porosity which may act as pre-existing cracks. While this may not be a problem in some cases, it is a consideration where the finished part is in a part which is subject to relatively high impact loads, e.g. a drill bit for example.

In those instances in which the bonded TSPCD product is to be mounted to a high modulus backing, the processing may involve two thermal cycles to bond the TSPCD product to a tungsten carbide back-up element. While effective, the processing steps increase the costs.

Even though these problems exist, the advantage of this form of processing is the ability to provide a high strength, low thermal expansion material to bond the TSPCD together. There are known ductile materials which may be added to the powder or the binder in accordance with this invention to decrease the brittleness of the sintered matrix carrier.

It is preferred to use liquid phase infiltration as the last process step. In this processing, the product from the isostatic pressing operation is heated to cause a metal binder to flow through the compacted powder and bind it together and to the TSPCD elements.

Regardless of the type of processing as herein described, the hard ceramic powder in the matrix carrier can be of relatively high volume percentage, e.g., above 50% and up to 90% by volume. The provision of a relatively high density final product, which is formed in situ at relatively low pressures and temperatures and which is temperature stable to about 1,200 degrees C. offers advantages not heretofore obtained.

The metal binder material should be one which in a liquid state can wet the coating on the TSPCD and the hard ceramic powder particles. It is also preferred that the binder metal have good mechanical properties such as ductility and strength. Typical such binders are copper or nickel based brazing alloys, copper-tin-manganese-nickel alloys, the latter being the preferred binder material.

The processing above described, as already noted may be used to form a wide variety of products which are characterized as having a strong chemical bond between the coating and the TSPCD and between the coating and the supporting structure. It is this chemical bonding which provides the significant strength over that which can be achieved by merely a mechanical gripping of the TSPCD. The advantage of this invention is that the TSPCD elements or element are effectively locked in or on a support structure to provide a TSPCD cutting element as contrasted to the prior temperature sensitive supported TSPCD elements commercially available.

Referring to the drawings which illustrate preferred forms of the present invention, FIG. 2 illustrates a TSPCD product 30 which includes six (6) of initially separate TSPCD elements 31a to 31f of generally triangular shape. The TSPCD elements may be bonded together in or on a support structure 32, see also FIG. 3, which may be an infiltrated or sintered powdered material. The support structure may be of various dimensions and of various axial lengths, as indicated by the break line 33.

As seen in FIGS. 2 and 3, the TSPCD elements include at least one side face 34a which may be positioned adjacent to but spaced a small distance from the side face 34b of the adjacent TSPCD element. The distance between adjacent TSPCD elements, referred to as the gap and illustrated as 35 in FIG. 3, may be of the dimensions previously indicated.

Referring to FIG. 4, for example, the gap 35 is illustrated with reference to its condition after cold isostatic pressing and before further processing. Each of the TSPCD elements 37 and 38 includes the coating 37a and 38a, respectively, the TSPCD elements being spaced from each other by the gap width. Between the coated surfaces is the powder material (not shown) such that the gap is TSPCD face-coating-powder-coating- TSPCD face. In subsequent processing, a strong chemical bond is formed from the TSPCD face through the coating, through the powder, through the coating of the adjacent TSPCD face and to the adjacent TSPCD.

Again referring to FIGS. 2 and 3, in the resulting TSPCD product 30, essentially all surfaces of the TSPCD elements, save one, are in contact with bonded support material, i.e., there is material on the bottom face 41 and peripherally around the outer faces, as indicated at 42 and in the gap 35, while one face 44 is exposed. This form provides the optimum bonding of the TSPCD elements together. This product may be assembled to a bit body during infiltration of the bit to form the matrix bit body. It is also possible to braze the product into the bit body, in which event, higher temperature braze alloys may be used than have heretofor been used.

The form of TSPCD product in accordance with this invention shown diagrammatically in FIG. 5 illustrates that not all of the faces need be fully in contact and bonded to the support element. Here a triangular TSPCD element 50 includes side faces 50a, 50b and 50c which are only partially beneath the top surface 52 of the support structure 53 shown as triangular for purposes of illustration. Due to the strong chemical bonding between the TSPCD element and the support structure, it is possible to expose a substantial portion of the large flat face 50d of the TSPCD element while the body of the TSPCD element is substantially above the support body. Thus, for example it is possible in accordance with this invention to form large bearings from smaller TSPCD elements.

Referring to FIGS. 6 and 6a, for example, a TSPCD product 60 is illustrated which may be used as a bearing or the like. This form of product also illustrates that TSPCD elements of different geometrical shapes may be used to form useful TSPCD products. In this form, TSPCD elements 61 and 63 are half circular disks while TSPCD element 64 is square, although it may also be rectangular. The TSPCD elements are bonded to a support 65 of metal powder processed as already described with gaps 66a and 66b between adjacent elements. As illustrated the gaps, however, are not filled with matrix carrier material thus effectively providing channels between the spaced and facing exposed side faces 61f-64f and 64g-63f, the elements 61, 63 and 64 being positioned such that a substantial portion is exposed as noted with reference to FIG. 5. When used as a bearing, the channels may provide for flow of cooling or lubricating fluid, if desired. If channels are not needed, the gaps may be substantially filled as illustrated in FIG. 3, i.e., the surface of the support is even with the top surface of the TSPCD elements.

Not all of the side faces need be in contact with and bonded to the support material. Thus, for example as illustrated in FIG. 7, a single point dressing tool 70 is shown which includes a TSPCD element 72 mounted on and bonded to a support 74 such that one face 72a is fully contacted by the support material which effectively forms a shoulder 76 to the rear of the element 72. Faces 72b and 72c are fully exposed while the bottom surface is bonded to the support. While element 72 is indicated as triangular, it may be other shapes such as square, rectangular, semi-circular or circular, for example.

The ability to bond a TSPCD element firmly in a support structure permits the fabrication of unique cutting and abrading products. For example, FIGS. 8 and 8a illustrate an improved saw blade segment 80 composed of a plurality of TSPCD elements 81a through 81k, bonded to a support structure 83. In the form illustrated, the TSPCD elements are circular in shape although other geometrical shapes may be used. Circular shapes, however, have the advantage of providing a relatively large surface area for firmly bonding the elements to the support structure. The diameter of the elements may be in the range of one millimeter or larger depending upon the use of the segment. Prior art saw blade segments were either impregnated with diamond dust or used spherical natural diamonds. In the either case as the supporting matrix carrier was worn due to use, the diamond material was lost due to loss of supporting structure. This problem is largely overcome by the present invention since the TSPCD elements are firmly chemically bonded over a comparatively large surface area.

The TSPCD elements are preferably arranged in a redundant pattern such that elements 81e through 81g are to the rear and in the space between the adjacent lead elements 81a–81d, with elements 81h–81k oriented in the spaces between 81e–81g. Thus, for example if the thickness of the elements is equal to or greater than the gap dimension between adjacent side-by-side elements 81a–81d, the entire face of the cut in the workpiece is traversed by at least one cutter. The redundancy may be two or more, that is, additional elements may be arranged to provide added redundancy as may be needed.

As illustrated in FIG. 8a, each element 81a–81k includes an exposed arcuate cutting face, for example 81aa, 81ee and 81hh extending above the surface 84 of the support 83, with a substantial portion of each element firmly and chemically bonded to the support. As the segment wears in use, the elements are retained to a much greater degree than the prior diamond cutting segments. While circular elements have been described, one may use a half-circle or quarter-round TSPCD elements, preferably mounted such that the curved peripheral surface is exposed to form the leading cutting edge. Such materials are commercially available or may be cut off a cylindrical TSPCD part to the desired thickness.

The ability to anchor and firmly bond a TSPCD element to a support structure permits the fabrication of a wide variety of cutting and abrading tools. It also permits the fabrication of products that are other than abrading or cutting tools, such as bearings, as described and, for example, a lead bonding tool. Heretofore, lead bonding tools have been made of a single crystal diamond cut to a precise shape and dimension with a flat working face. Typically these tools are used to bond lead elements to solid state chips and the like by being brought into contact with the chip and bonding the leads in a precise and exact location to the chip through heat and pressure. Normally the temperature is about 500 degrees C. and natural diamonds are able to withstand this temperature. However, it is difficult to support these natural diamonds in a support structure and if they move even slightly, problems may be encountered in their use since the bonding operation requires precision. In accordance with this invention, an improved lead bonding tool is provided which is firmly anchored in a support structure and which is temperature stable.

Referring to FIG. 9, an improved lead bonding tool 90 is illustrated and includes a TSPCD element 92 bonded to a support structure 94, the latter being metallic and including an aperture 95 therein for a heater and including a shank 96 for mounting in the lead bonding machine. The support usually includes a cylindrical section 97 having a frusto-conical end 98 with the element 92 mounted at the tip of the end 98. The element 92 includes a working face 99 which projects beyond the end 98 and which is of a precise flatness and face dimension, i.e., length and width. The face contour may be square or rectangular, or any other shape, as may be desired. Heat may be applied to heat the element in a conventional manner normally used to heat the lead bonding tool. In use the tool is subject to vibration and heat which requires that the element be firmly and accurately mounted and maintained in that accurate mounting during use. By the present invention, the TSPCD element 92 may be chemically bonded to the support structure which may be the support 94 or a separate insert to be received in the support. The advantage of this invention is that a TSPCD element may be used which may be relatively easily affixed to a support structure.

Thus, for example, the element 92 may be shaped to the precise required length and width dimensions and in situ bonded to a support structure. If the support structure is the support 94, the face of the TSPCD may be precision ground to the desired flatness such that the plane of the face 99 is referenced to the support structure, an operation which is difficult to achieve with single crystal diamonds. It is also possible to form a lead bonding tool by formation of a TSPCD support structure which is then assembled to the body 94, rather than forming the entire assembly in one step.

One aspect of this invention is the ability to form a TSPCD product of virtually any shape or size from smaller TSPCD elements. The TSPCD product illustrated in FIG. 10 is an example. There a large TSPCD product 100 is composed of a multiplicity of triangular TSPCD elements 101 in a TSPCD part which is essentially circular in overall shape, although it may be of any shape. In the form illustrated, there is a surrounding portion 105 of tungsten carbide, for example. The tungsten carbide may be of 70 volume percent tungsten carbide. By way of example, the part may be 50 mm in diameter and is useful as a cutter for oil and gas drill and core bits.

Figure 11:
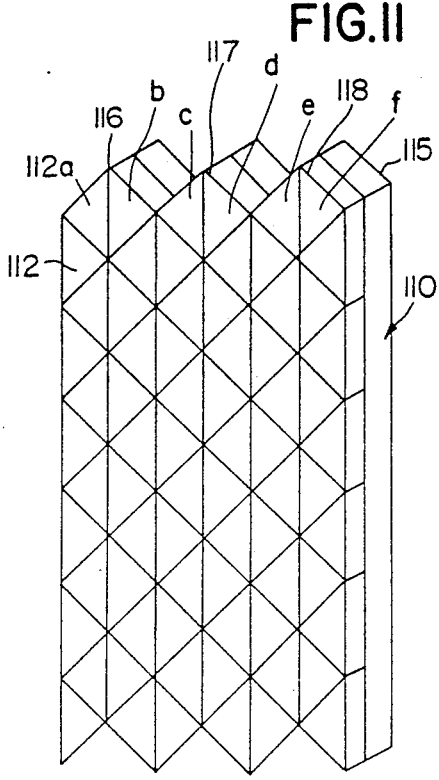
FIG. 11 is a perspective view of another form of TSPCD product in accordance with this invention.

FIG. 11 illustrates another TSPCD product 110 in accordance with this invention composed of a plurality of TSPCD elements 112 illustrated as being triangular pieces which may be for instance 3 per carat or 1 per carat. The elements 112 are bonded together and to a support 115 such as tungsten carbide by any of the methods already described, so as to form a unitary structure in which the previously separate elements are chemically bonded together and to the tungsten carbide and to the tungsten carbide backing 115. It is understood that the backing may be any of the carbide materials already described.

Figure 11A:
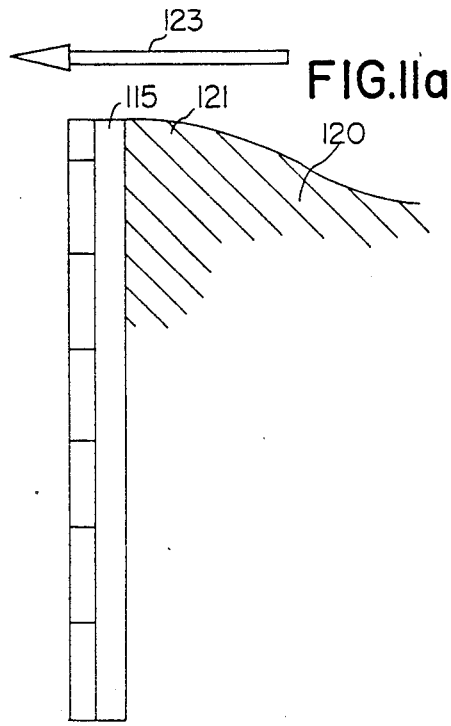
FIG. 11a is a view, partly in section and partly in elevation, illustrating the mounting and use of the product illustrated in FIG. 11.

The form of the invention illustrated in FIG. 11 illustrates the variety of TSPCD products that may be fabricated in accordance with this invention. This particular structure provides for a plurality of cutting elements 112a and b, 112c and d, and 112e and f, which form pairs which together provide a series of cutting points 116, 117 and 118. In use in a bit, as shown in FIG. 11a, the cutting product 110 may be mounted directly into the body matrix during body matrix infiltration or formation. In this form, there is a back support 121 provided which contacts the backing 115, the cutting direction being indicated by the arrow 123. The tungsten carbide backing 115 provides for increased impact strength.

The cutting product 110 is exposed such that at least one top row of elements 112a–112f are essentially fully exposed. In use as the top row of cutters wear, new cutting surfaces are regenerated from the cutter elements below the top row. This product also illustrates the fact that adjacent elements include at least one side surface which is located adjacent to the adjoining piece, the spacing being as already described.

To improve the cutter performance in terms of regenerating cutter edges and points, the amount of matrix carrier between adjacent TSPCD elements may be reduced in cross-sectional thickness in order to provide controlled weakness planes in the cutter structure thereby providing for fracture of the cutter along predetermined planes of fracture. In this way as the loading on a cutter region increases, the cutter is broken out of the support to provide a new cutter element. Since earth boring, in part, relies upon a kerfing type of cutting, the formation of an uneven overall cutting surface generally tends to improve the cutting action in certain types of formations.

As already noted, the products of the present invention are much stronger than products previously described as mechanical mosaic structures. Referring to FIGS. 12a to 12d, FIG. 12a illustrates diagrammatically a three point bending test in which loads are applied to a part 130 in one direction as indicated by the arrows 131 and 132 and a load is applied in another direction as indicated by the arrow 133. The force necessary to bring about fracture through the joint 135 or through the joined parts 136 is measured and expressed in terms of pounds per square inch to failure.

FIG. 12b illustrates a TSPCD part 140 in accordance with this invention made up of triangular TSPCD elements 141 joined together as indicated at the joints 142 by the methods already described. The part 140 was processed by sintering tungsten coated 3 per carat TSPCD elements with tungsten powder which had been compressed to a volume percentage of 90%. In the three point test, the failure mode was in the joint between adjacent elements, as indicated at 145. The load to failure was 21,000 psi.

FIG. 12c is similar in structure to that of FIG. 12b, but the part 150 was formed from tungsten coated 3 per carat TSPCD elements which were liquid state infiltrated with tungsten carbide using a copper binder, as described, and processed as described. In the three point test, the failure mode was through the TSPCD as indicated at 155 and the load to failure was 26,000 psi.

FIG. 12d illustrates a mechanical mosaic structure 160 which is essentially the same as 150, but in which the TSPCD elements were not coated and in which the part was processed using conventional infiltration techniques with the same tungsten carbide and binder used to form the part 150. In the three point test, the failure was through the joint, as indicated at 165, and the load to failure was zero psi.

Other test data indicates that the thickness of the carbide forming coating is significant. These data were derived from the use of a matrix material in which the binder included nickel and manganese. In the case of tungsten coated material, it has been observed that nickel and/or manganese tend to adversely affect the coating if the coating is too thin, for example below about 3 microns. However, if the binder for the matrix is copper or tin or combinations thereof, thinner coatings of one micron may be used for less demanding applications. If the binder for the matrix is from the iron group, e.g., nickel or manganese, somewhat thicker coatings are needed to prevent the binder from penetrating the coating on the diamonds.

For example, in a shear test where coated TSPCD is bonded to a matrix carrier, as described, and subject to a lateral pushing force, the results indicate that in the range of 1 to 5 microns, there is improvement in the bond strength to about 5,000 psi. The failure mode at this range of coating thickness is by failure at the interface of the coating and the matrix carrier. In the range of about 5 to 7 to about 8 to 10 microns thickness, the fracture is mixed in nature, in that the fracture sometimes is at the stated interface and sometimes through the TSPCD. The stated fractures occur at bond strengths in the range of about 5,000 psi and up to about 23,000 psi. In one example with a 9 micron tungsten coating a bond strength of about 23,000 psi was measured. In this range of bond strengths, the TSPCD product in accordance with this invention has a wide variety of uses. Above about 10 microns, the fracture mode is through the TSPCD element and not through the bond, i.e., this means that the interfaces between the PCD and the coating, the coating and the bond, the coating itself and the bond itself are all stronger than the PCD. These fractures of the TSPCD element, rather than at the interface between the support structure and the TSPCD element occur typically at strengths in the range of above about 22,000 to 23,000 psi. Above about 15 microns of coating thickness, the bond strengths seem to level off at about 27,000 to 29,000 psi, with fracture through the TSPCD element rather than the bond interfaces, even though the coating thickness increases to 20 microns or more. For coating thicknesses above about 30 microns, there does not appear to be any increase in bond strength over that achieved in the range of 15 to 30 microns.

By way of further comparison, a titanium carbide coated TSPCD element having a thickness of about 5 to 10 microns, typically at 7 microns, and a total coating thickness (including a nickel oxidation protective coating) of about 30 to 50 microns exhibited mixed failures through the bond and through the TSPCD element at about 15,000 psi. These data also tend to establish that a tungsten coating, absent any oxidation protective coating, having the thickness dimensions described, is superior to products with a titanium carbide coating and a nickel protective coating. The achievement of sufficiently high bond strengths to result in the failure of the TSPCD rather than the bond of the latter to the supporting structure offers considerable advantages, especially in the cases of those products which require a strong bond of a cutter-type product in some form of support structure.

Figure 13:
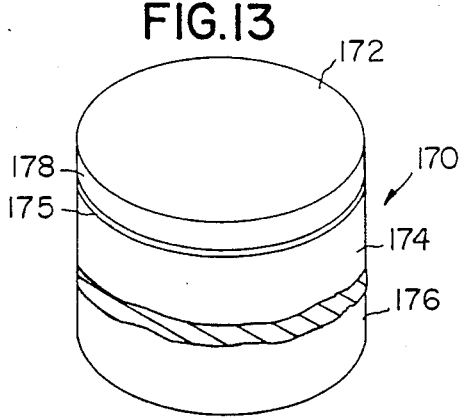
FIG. 13 is a view in perspective of another form of TSPCD product in accordance with this invention.

Referring to FIG. 13, there is illustrated a product 170 which includes a TSPCD element 172 firmly secured to a tungsten carbide support element 174. While the product 170 superficially resembles the appearance of a prior art non temperature stable PCD cutter, it is quite different.

More specifically, the TSPCD element may be a product available commercially as SYNDAX, a TSPCD material in the form of a thin one-piece disc. The dimensions of the disc 172 may vary widely from a diameter of 2 to 3 mm to as much as 50 mm or more. The disc 172 is firmly chemically bonded to the support element 174 through the chemical bond formed through the coating applied to the disc 172 which in turn is bonded to the infiltrated or sintered material 175.

The support 174 may be separately formed and the disc 172 and the material 175 may be assembled and processed as described. The result is the chemical bonding of a TSPCD to a preformed support. The advantage is that the length, diameter and shape of the support is not limited by the size of the high pressure high temperature presses normally used to form prior art products. The cost for making such a product is less than that for the non temperature stable product, but a more important advantage is the ability to form the support of essentially any length, as indicated by the break line 176, without requiring larger presses. This form of product also has the advantage of being temperature stable up to about 1,200 degrees C. and may thus be infiltrated simultaneously with the formation of a supporting matrix, for example a matrix body for a drill bit. Alternatively, the product may be brazed into the bit body by the use of higher temperature brazing materials than have been heretofore used. It is also understood that the coated diamond may be brazed to a suitable support such as cemented tungsten carbide, and the like, since the braze joint is between the coating on the diamond and the support element. Since the diamond is temperature stable, higher melting point brazing alloys may be used as compared to those alloys which are used with diamond product which are not temperature stable, as herein defined.

Figure 13A:
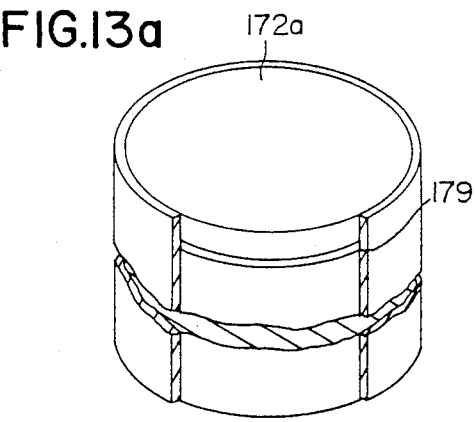
FIG. 13a is a view similar to that of FIG. 13 but illustrating a modified form of product in accordance with this invention.

As illustrated in FIG. 13, the side surface 178 of the disc is free of sintered or infiltrated material. In the form illustrated in FIG. 13a, the sintered or infiltrated material may cover the sides of the disc 172a, as indicated at 179 for added strength.

Figure 14:
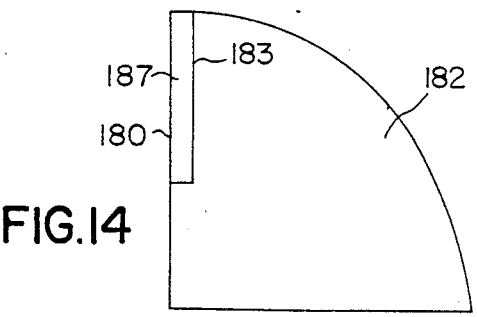
FIG. 14 is a view in section illustrating still another form of product in accordance with this invention.

FIG. 14 illustrates a structure in which one or more TSPCD elements 180 are affixed to a supporting body such that the back side 183 of the elements are in contact with the support body while the side faces are adjacent to each other or include a fully exposed side face, as indicated at 187. In this particular case, the support body may be a saw blade segment or a preformed and preshaped cutter for an earth boring bit. While the configuration of the product illustrated in this figure may appear similar to some of the illustrations of U.S. Pat. No. 3,938,599 issued to Horn, there are significant differences. Unlike the Horn structure, that of the present invention is chemically bonded to the supporting matrix carrier and is far stronger than a mere mechanical bond as described in the referenced patent, see also the data previously described. This strong bonding allows for the provision of a variety of products.

Figure 15:
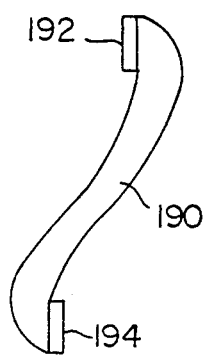
FIG. 15 is a view, in perspective, of a twist drill in accordance with the present invention.

Thus, for example, FIG. 15 illustrates a twist drill 190 having segments 192 and 194 mounted thereon. Segments 192 and 194 may be a TSPCD product in accordance with this invention containing one or more TSPCD elements in a support structure. The drill bit may be of a ¼ inch or larger size.

Figure 16:
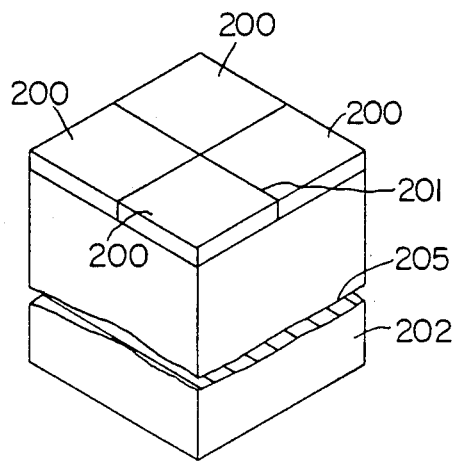
FIG. 16 is a view in perspective of still another product in accordance with this invention.

FIG. 16 illustrates a form of the invention similar to that of FIG. 13 wherein the TSPCD elements 200 are square in shape. The TSPCD elements are bonded to each other through the material 201 and to the base 202, as described. The base may be of a shape other than square and may be of any length as indicated by the break line 205.

Figure 17:
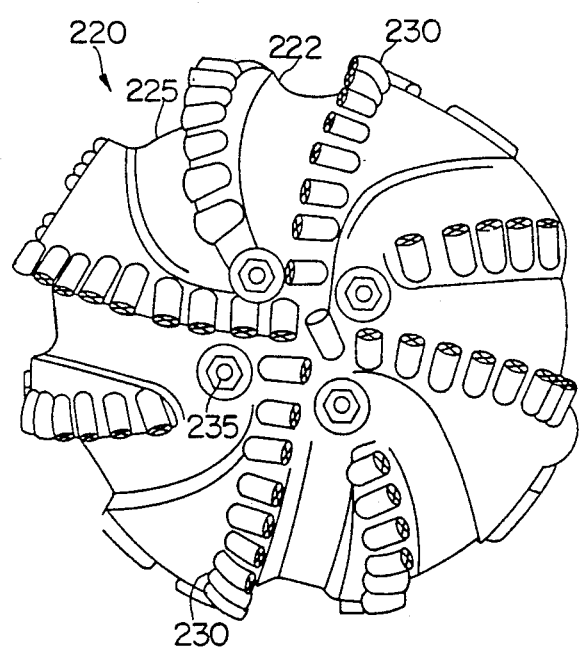
FIG. 17 is a perspective view of one form of earth boring bit in accordance with this invention.
Figure 18:
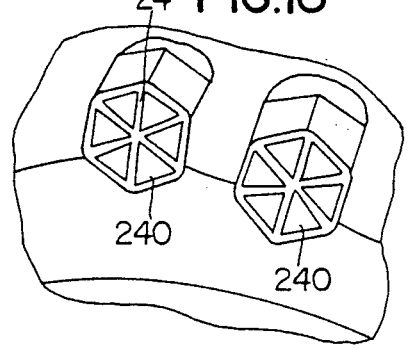
FIG. 18 is an enlarged fragmentary view of the cutters illustrated in FIG. 17 and produced in accordance with this invention.

FIGS. 17 and 18 illustrate a drill bit 220 in accordance with the present invention. The bit includes a body 222, preferably of matrix material such as carbide, having a plurality of waterways 225 associated with a plurality of blades 230. It is to be understood that in referring to the bit body as a matrix body, the matrix material of the bit body may be a relatively thin coating on a suitable support structure. The bit also includes nozzles 23 for flow of fluid form the interior of the body to the waterways to cool and clean the bit.

As shown in FIG. 18, each blade includes a plurality of cutters 240 having a configuration as illustrated in FIG. 2, for example. The cutters 240 are mounted in the matrix body during infiltration of the body thus eliminating the need to braze the individual cutters into the bit body. As mentioned, each of the cutters, by virtue of the production thereof is temperature stable to 1,200 degrees C. It is understood that other cutter configurations in accordance with this invention may be used, for example that illustrated in FIG. 10 or in FIG. 13, for example. It is also possible to provide cutters of selected geometry, e.g., quarter circles, half circles and the like.

Figure 19:
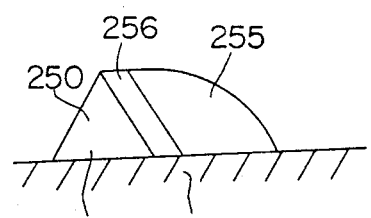
FIG. 19 is an enlarged fragmentary view, partly in section and partly in elevation, illustrating the improved bonding between the TSPCD element and a support matrix in accordance with this invention.

In FIG. 19, the coated TSPCD 250 is assembled to a matrix support, as for example a matrix body drill bit 252. It is to be noted that essentially the entire face 253 of the triangular element is above the matrix as compared to the prior designs. This arrangement is possible because in accordance with this invention, there is a bond between the surfaces of the TSPCD in contact with the matrix and the opposed surfaces of the matrix. While a backing structure 255 is illustrated, both the side faces 256 and the front face 253 are fully exposed. In this way, the cutter may be mounted such that there is total full face exposure.

Drill bit or core bit bodies may be of any of a number of types, as is known in the art. Thus, for example, stepped bit designs may be used with a significant cutter exposure. The ability to fabricate cutters to different desired geometries as may be needed for effective cutting action in various formations is now possible in accordance with this invention.

Typical processing of TSPCD elements in accordance with this invention is set forth in the following specific example, by way of illustration.

Triangular temperature stable TSPCD elements of a size of 3 per carat were coated with tungsten metal to a thickness of about 6 microns. The powder used to form the matrix carrier was tungsten carbide powder of 3 to 5 micron particle size. About 1,000 grams of this powder were completely and thoroughly mixed with a solution of 200 ml. of hexane in which 20 grams of paraffin and mineral oil had been dissolved. The resultant mixture was heated to between 80 to 100 degrees C. for 45 minutes to evaporate the hexane completely. The processed powder was then ball milled, as described, for thirty minutes to break up the flocculated powder and then screened through a 200 mesh screen.

The tungsten coated TSPCD elements were arranged in a suitable hexagonal die and 4.5 grams of the processed tungsten carbide powder was placed in the mold to fill the space between the TSPCD elements and to cover them. The resulting assembly was then cold pressed at 20,000 psi to form a hexagonal preform.

The hexagonal preform was then loaded into a rubber mold which was then evacuated and sealed and then isostatically pressed at 29,000 psi. The resulting product was then ground to specific size.

The isostatically processed hexagonal product was then placed on a crucible with 2.6 grams of a copper based alloy (Cu-Sn-Mn-Ni) on the powder side. The preform was then heated in a vacuum furnace (10 to the minus 5 torr) at the rate of 5 degrees C. per minute up to 400 degrees C. for one hour and then at 10 degrees C. per minute to a temperature of 1160 degrees C. for one hour for infiltration, later followed by cooling.

Heating at a temperature over 1100 degrees C. for one hour is important because it is at this stage that tungsten carbide formation takes place. Typically the tungsten carbide layer thus formed is about 3 microns thick.

If the preform is heated quickly to 1,000 degrees C. and held for 1.5 hours, the formed tungsten carbide layer is about 0.3 microns thick. Heating to the carbide forming temperature at the rate of 10 degree C. per minute may also be used.

After the thermal cycle, the finished product is surface ground to a thickness of about 0.315 of an inch and may be used.

As a variant, cemented tungsten carbide grit (94% by weight of tungsten carbide bonded with 6% by weight of cobalt, a commercially available material) of 400 mesh size was mixed with a solution of 2% by weight paraffin in hexane.

It is within the scope of this invention to form the isostatically pressed part and then process that part so that it is simultaneously bonded to a supporting structure such as a matrix bit body or other support structure while effecting conversion to the carbide layer described. For example, carburized tungsten powder in the nominal size range of 3 to 5 microns was ball milled with 1% by weight of nickel powder (325 mesh) for one hour. The milled powder mixture was then mixed with a solution of 2% by weight of paraffin wax in hexane.

The mixture was dried by heating and then the processed powders were used with triangular TSPCD elements, coated as already described, to form a much larger assembly, as described. The larger assembly was cold axially pressed and then isostatically pressed as described. The resulting product was a "green" hexagonal cutter as shown in FIG. 2. The green assembly was then heated to burn off the organic material and held at a temperature of 1,000 degrees C. for one hour.

Thereafter, the processed green assembly, sufficiently strong to be handled was assembled to a matrix powder material in a mold, e.g. the matrix bit forming operation, and the matrix infiltrated at 1,200 degrees C. During the matrix infiltration, the green assembly was bonded to the matrix and the coating was formed into the carbide layer. In this processing there was a strong bond between the metal binder of the matrix and that in the green assembly and between the coating, powder and matrix supporting structure. Essentially the same processing may be used to form other products already described in or on a matrix carrier support element.

Another form of one step infiltration involves the use of powders processed as follows: As received carburized tungsten carbide powder in a particle size range of from 3 to 5 microns was screened through a 200 mesh screen to break up the agglomerates which tend to form in the fine powder. The screened powders were mixed with 7 weight percent of nickel powder having a particle size in the range of 3 to 7 microns and mixed in a suitable mixer for one hour. A second tungsten carbide powder of a particle size in the range of 3 to 5 microns was screened through a 200 mesh screen to break of the larger agglomerates. The screened material was then ball milled with 3 weight percent of nickel powder of a particle size range of from 3 to 7 microns with 2 weight percent of paraffin in a hexane solution for about eight hours. The ball milled powders were then dried and coated with paraffin.

Six pieces of tungsten coated triangular TSPCD elements, coated as already described, of a size of 3 per carat were arranged in a hexagonal punch and about 0.8 grams of the second powder was placed between the TSPCD elements, spaced as already described. About 4 grams of the first powder was then placed in the die and a hexagon product was formed under pressure of 15,000 psig. The cold pressed hexagonal product was then isostatically pressed at 29,000 psig. After isostatic pressing the hexagonal product was infiltrated directly into a matrix, such as a drill bit matrix using a copper-manganese-tin-nickel alloy.

In another example, tungsten carbide powder in the size range of 20 to 30 microns and in the range of 60 to 70 microns was ball milled with 3 weight percent of nickel powder, of the type and size described, with 2 weight percent of paraffin in a hexane solution. The powders were dried, screened through a 200 mesh screen, assembled to TSPCD elements as already described and cold pressed in the fixture.

The cold pressed material with the TSPCD elements was then transferred to a high vacuum furnace, optionally a hydrogen furnace, to burn off the organic components by heating relatively slowly. This was accomplished by heating at a rate of about 5 degrees C. per minute to a temperature of 800 degrees C. The burned off hexagonal shapes were then assembled in a mold, and infiltrated into a matrix to provide a finished part, in this case a drill bit.

It is to be understood that the one-step infiltration process described may be used to form any of a variety of products in accordance with this invention.

In an alternate embodiment of the invention, the coated TSPCD elements may be bonded directly to the body of a tool matrix instead of to a matrix carrier which is in turn bonded to a tool matrix. In such a case, the steps of compacting the matrix powder by cold axial pressing and cold isostatic pressing are normally eliminated with the result that the matrix found after infiltration or sintering is not as dense as that obtained with the compacting steps. Such products are quite satisfactory, however, for products such as oil and gas drill and core bits and have important advantages in case of fabrication.

The abrasive character of the products in accordance with the present invention may be enhanced somewhat by adding to the powder materials relatively small particles of diamond or TSPCD material in the form of particles having the approximate size of the powders used. The volume percent of such diamond powders may be as high as 40% and the resulting material is processed as already described with the bonding as already described. The starting diamond material is preferably synthetic polycrystalline diamond which is temperature stable although natural diamond material may also be used in some instances.

It will be apparent to those skilled in the art that there may be variations and alterations, based on the above detailed disclosures, of the various procedures and product here described. It is to be considered that the same may come within the scope of the present invention as set forth in the appended claims.

What is claimed is:

1. A temperature stable diamond product having a temperature stability up to about 1,200 degrees C. comprising:

a metal matrix carrier,
at least one polycrystalline diamond piece of a predetermined geometrical shape and which is temperature stable up to about 1,200 degrees C. having at least one surface contacting at least a portion of said carrier,
each diamond piece being coated with a metal which is a carbide former on at least the portion thereof contacting said metal matrix carrier,
said carbide forming coating being of a thickness of at least about 1 micron and including a relatively thin portion of a carbide material adjacent to said portion thereof contacting said diamond piece, and
said temperature stable diamond product having chemical bonds between said temperature stable diamond and said coating, and between said coating and the portion of said matrix carrier which is in contact with said coating, said chemical bonds exhibiting a bond strength in shear of at least 5,000 pounds per square inch.

2. A temperature stable diamond product as set forth in claim 1 wherein said diamond piece is a synthetic diamond piece which includes a face, at least a portion of said face being in contact with said matrix carrier, and
said metal matrix carrier being tungsten carbide and extending to the rear of the face a predetermined distance and forming a backing integral with said diamond piece.

3. A temperature stable diamond product as set forth in claim 1 wherein said temperature stable diamond includes at least one side face, and
said side face being coated with said metal which is a carbide former and being at least partially in contact with said matrix carrier.

4. A temperature stable diamond product as set forth in claim 1 wherein said product includes a plurality of initially separate temperature stable diamond pieces arranged in a predetermined pattern and including opposed surface portions forming a small gap therebetween, and
matrix carrier being located in said gap and contacting at least a portion of the surface portions of said temperature stable diamond elements.

5. A temperature stable diamond product as set forth in claim 4 wherein at least some of said temperature stable diamond elements are generally triangular in shape.

6. A temperature stable diamond product as set forth in claim 1 wherein said product is generally circular in shape and said temperature stable diamond is generally circular in shape.

7. A temperature stable diamond product as set forth in claim 1 wherein said product is a cutter for an earth boring bit.

8. A temperature stable diamond product as set forth in claim 7 in which said product includes more than one initially separate temperature stable diamond elements.

9. A temperature stable diamond product as set forth in claim 4 in which said gap is between 6 and 30 mils.

10. A temperature stable diamond product as set forth in claim 1 in which said coating has a thickness of up to about 30 microns.

11. A temperature stable diamond product as set forth in claim 1 in which said matrix carrier includes a carbide and a binder.

12. A temperature stable diamond product as set forth in claim 1 in which said matrix carrier is a sintered metal.

13. A temperature stable diamond product as set forth in claim 1 in which said coating includes at least one metal selected from the metals of Group IVA, VA, VIA, VIIA and alloys and mixtures thereof.

14. A temperature stable diamond product as set forth in claim 11 in which said carbide is selected from the group consisting of the carbides of tungsten, chromium, niobium, titanium, tantalum, zirconium and molybdenum.

15. A temperature stable diamond product as set forth in claim 12 in which said sintered metal is selected from the group consisting of tungsten, nickel, tantalum, molybdenum, cobalt and sintered tungsten body infiltrated by a copper based alloy.

16. A temperature stable diamond product as set forth in claim 1 wherein said diamond piece is composed of at least 60% by volume of diamond aggregates.

17. A temperature stable diamond product having a temperature stability up to about 1,200 degrees C. comprising:
a metal matrix carrier selected from the group consisting of tungsten metal powder and the carbides of tungsten, titanium, tantalum and molybdenum,
at least one diamond piece of a predetermined geometrical shape and which is temperature stable up to about 1,200 degrees C. having at least one surface contacting at least a portion of said carrier,
said diamond being a polycrystalline diamond composed of at least 60% by volume of diamond aggregates,
each diamond piece being coated with a metal coating which is a carbide former on at least the portion thereof contacting said metal matrix carrier,
said coating on said temperature stable diamond having a thickness of at least about one micron and including a relatively thin carbide layer,
said carbide former being a metal selected from the group consisting of Group IVA, VA, VIA and VIIA metals and alloys and mixtures thereof, and
said temperature stable diamond product having chemical bonds between said temperature stable diamond and said coating and between said coating and the portion of said matrix carrier which is in contact with said coating, said chemical bonds exhibiting a bond strength in shear of at least 5,000 pounds per square inch.

18. A temperature stable diamond product as set forth in claim 17 which includes a plurality of initially separate temperature stable diamond elements arranged in a predetermined relationship and including opposed surface portions forming a gap therebetween,
said gap being in the range of between less than 1 mil and 500 mils, and
said matrix carrier being located in said gap and contacting at least a portion of the surface portions of said temperature stable diamond elements.

19. A temperature stable diamond product as set forth in claim 17 in which said product is a saw blade segment.

20. A temperature stable diamond product as set forth in claim 17 in which said product is a bearing element.

21. A temperature stable diamond product as set forth in claim 17 in which said product is a dressing tool.

22. A temperature stable diamond product as set forth in claim 17 in which said product is a cutter adapted to be mounted on an earth boring bit.

23. A temperature stable diamond product as set forth in claim 17 in which said product is a component of a twist drill.

24. A temperature stable diamond product as set forth in claim 17 in which said product is a lead bonding tool.

25. A temperature stable diamond product as set forth in claim 17 in which said product is a single point dressing tool.

26. A temperature stable diamond product having a temperature stability up to about 1,200 degrees C. comprising:
a metal matrix carrier including a powdered material and a binder therefor,
a plurality of polycrystalline diamond pieces of a predetermined geometrical shape each of which is temperature stable up to about 1,200 degrees C. and at least some of which have at least one surface contacting at least a portion of said carrier,
at least some of said diamond pieces being in butting relation with an adjacent diamond piece,
each diamond piece being coated with a metal which is a carbide former on at least the portion thereof contacting said metal matrix carrier and on the surface portion which is adjacent to another diamond piece,
the coating on said diamond piece being at least about 3 microns in thickness, and
said temperature stable diamond product having chemical bonds between said temperature stable diamond and said coating, and between said coating and the binder for said matrix carrier which is in contact with said coating, said chemical bonds exhibiting a bond strength in shear of at least 5,000 pounds per square inch.

27. A temperature stable diamond product, comprising:
a matrix body,
at least one cutter element bonded to said matrix body,
said cutter element comprising at least one polycrystalline diamond element which is temperature stable to about 1,200° C. and a matrix carrier which is chemically bonded thereto,
said temperature stable diamond element having a carbide forming metal coating at least 5 microns thick on the surface thereof in contact with said matrix carrier, said metal being chosen from the group consisting of tungsten, tantalum, and molybdenum,
said metal coating comprising a carbide layer adjacent to said diamond element and a substantially metallic outer portion adjacent to said matrix carrier,
said diamond element being chemically bonded to said metal coating by means of said carbide layer, and said metallic outer portion being chemically bonded to said matrix carrier, said carbide layer bonding said diamond element to said matrix carrier with a bond strength in shear of at least 5,000 pounds per square inch.

28. The diamond product of claim 27 wherein said metal coating is at least 10 microns thick.

29. The diamond product of claim 27 wherein said metal coating is about 10 to 30 microns thick.

30. The diamond product of claim 27 wherein said carbide layer bonds said diamond element to said matrix carrier with a bond strength in shear of at least 22,000 pounds per square inch.

31. The diamond product of claim 27 wherein said metal coating is tungsten.

32. The diamond product of claim 27 wherein said matrix carrier is a powdered material chosen from the group consisting of tungsten carbide, cemented tungsten carbide, titanium, carbide, tantalum carbide, molybdenum carbide, alumina, titanium nitride, silicon nitride, silicon carbide, tungsten, titanium, and mixtures thereof.

33. The diamond product of claim 27 wherein said matrix body is made from the same material as said matrix carrier.

34. The diamond product of claim 27 wherein said matrix carrier comprising tungsten carbide.

35. The diamond product of claim 27 wherein said cutter element includes a plurality of polycrystalline diamond elements.

36. The diamond product of claim 27 comprising a plurality of said cutter elements.

37. The diamond product of claim 27 wherein said metallic outer portion is chemically bonded to said matrix carrier by a metallurgical bond.

38. A temperature stable diamond product, comprising
a matrix body,
a matrix carrier metallurgically bonded to said matrix body,
at least one polycrystalline diamond element which is temperature stable to at least about 1,200° C.,
a tungsten coating at least 5 microns thick coated on said diamond element between said diamond element and said matrix carrier, said tungsten coating including a tungsten carbide layer adjacent said diamond element and an outer portion comprising substantially tungsten metal adjacent said matrix carrier,
said diamond element being chemically bonded to said tungsten coating by means of said carbide layer, and said outer portion of said tungsten coating being chemically bonded to said matrix carrier, said carbide layer bonding said diamond element to said matrix carrier with a bond strength in shear of at least 5,000 pounds per square inch.

39. The diamond product of claim 38 wherein said carbide layer bonds said diamond element to said matrix carrier with a bond strength in shear of at least 22,000 pounds per square inch.

40. The diamond product of claim 38 wherein said tungsten coating is at least 10 microns thick.

41. The diamond product of claim 38 wherein said tungsten coating is about 10 to 30 microns thick.

42. The diamond product of claim 38 comprising a plurality of diamond element chemically bonded to said matrix carrier.

43. The diamond product of claim 38 wherein said chemical bond between said outer portion of said tungsten coating and said matrix carrier is a metallurgical bond.

44. A temperature stable diamond product, comprising:
a matrix support,
at least one cutter element bonded to said matrix support, said cutter element comprising at least one preformed polycrystalline diamond element which is temperature stable to about 1200° C. coated with a carbide forming metal layer at least 5 microns thick,
said metal layer being selected from the group consisting of tungsten, tantalum, and molybdenum,
said metal layer including a carbide layer adjacent to said diamond element and a substantially metallic outer portion adjacent to said matrix support,
said diamond element being chemically bonded to said metal layer via said carbide layer, and said outer portion of said metal layer being chemically bonded to said matrix support, said carbide layer being of sufficient thickness to bond said diamond element to said matrix support with a bond strength in shear of at least 5,000 pounds per square inch.

45. The diamond product of claim 44 wherein said matrix support is a matrix carrier.

46. The diamond product of claim 44 wherein said matrix support is a matrix body.

47. The diamond product of claim 44 wherein said metal layer is in the range of 10-30 microns thick.

48. The diamond product of claim 44 wherein said carbide layer is of sufficient thickness to bond said diamond element to said matrix support with a bond strength in shear of at least 22,000 pounds per square inch.

49. The diamond product of claim 44 wherein said matrix support is a powdered material chosen from the group consisting of tungsten, titanium, tungsten carbide, cemented tungsten carbide, titanium carbide, tantalum carbide, molybdenum carbide, alumina, titanium nitride, silicon carbide, silicon nitride, and mixtures thereof.

50. The diamond product of claim 44 wherein said matrix support comprises tungsten carbide.

51. The diamond product of claim 44 wherein said metal layer comprises tungsten.

52. The diamond product of claim 44 wherein said chemical bond between said outer portion of said metal layer and said matrix support is a metallurgical bond.

53. The diamond product of claim 44 wherein said coated diamond element is brazed to said matrix support.

54. The diamond product of claim 44 wherein said matrix support is a matrix carrier and said diamond product further comprises a body, said coated diamond element being brazed to said body.

55. A temperature stable diamond product, comprising:
a matrix support,
a plurality of polycrystalline diamond elements which are temperature stable up to about 1,200° C. each of said diamond elements being preformed into a predetermined geometrical shape and each of which includes at least one surface metallurgically bonded to said matrix support,
a metal layer coating at least said metallurgically bonded surface of each of said polycrystalline diamond elements, said metal layer being selected from the group consisting of tungsten, tantalum, and molybdenum,
said metal layer being at least 5 microns thick and comprising a carbide layer adjacent to and chemically bonding each of said polycrystalline diamond elements to its metal layer, said metal layer further comprising a substantially metallic outer portion metallurgically bonding said metal layer to said matrix support, said carbide layer being of sufficient thickness to bond each of said polycrystalline diamond elements to said matrix support with a bond strength in shear of at least 5,000 pounds per square inch.

56. The diamond product of claim 55 wherein said plurality of diamond elements are configured into a predetermined mosaic pattern.

57. The diamond product of claim 55 wherein said matrix support is a matrix carrier.

58. The diamond product of claim 55 wherein said matrix support is a matrix body.

59. The diamond product of claim 55 wherein said metal layer is in the range of 10–30 microns thick.

60. The diamond product of claim 55 wherein said carbide layer is of sufficient thickness to bond said diamond element to said matrix support with a bond strength in shear of at least 22,000 psi.

61. The diamond product of claim 55 wherein said matrix support is a powdered material chosen from the group consisting of tungsten, titanium, tungsten carbide, cemented tungsten carbide, titanium carbide, tantalum carbide, molybdenum carbide, alumina, titanium nitride, silicon carbide, silicon nitride, and mixtures thereof.

62. The diamond product of claim 55 wherein said matrix support comprises tungsten carbide.

63. The diamond product of claim 55 wherein said metal layer comprises tungsten.

64. The diamond product of claim 55 wherein said diamond elements are brazed to said matrix support.

65. The diamond product of claim 55 wherein said matrix support is a matrix carrier and said diamond product further comprises a body, said diamond elements being brazed to said body.

66. A temperature stable diamond product, comprising:
a body, said body including
a plurality of temperature stable polycrystalline diamond elements each having a predetermined geometrical shape and a surface in contact with said body, each of said diamond elements having a surface positioned proximate a mating surface of an adjacent one of said diamond elements, and a coating of a carbide forming metal on the surface thereof bonded to said body and on said mating surfaces, said coating including a carbide layer bonding said element to said coating with a bond strength in shear of at least 5,000 psi, and an outer layer chemically bonded to said cutter or to said mating surface.

67. The diamond product of claim 66 wherein said body further includes a carrier matrix chemically bonding the surface of said diamond element in contact with said body to said body, said carrier matrix extending between said mating surfaces and chemically bonding said outer layer of said coatings on said mating surfaces to each other.

68. The diamond product of claim 66 wherein said carbide forming coating includes tungsten.

69. The diamond product of claim 66 wherein said mating surfaces are in contact with one another and are bonded together by a metallurgical bond between said outer layers of said coatings on said mating surfaces.

70. A temperature stable diamond product, comprising:
a body, said body including a carrier matrix, and
a plurality of temperature stable polycrystalline diamond elements affixed to said carrier matrix, each of said diamond elements having a coating of a carbide forming metal on the portions thereof in contact with said carrier matrix, said coating including a carbide layer bonding said element to said coating with a bond strength in shear of at least 5,000 psi, and an outer layer chemically bonded to the portion of said carrier matrix in contact therewith.

71. The diamond product of claim 70 wherein said diamond elements are of predetermined physical configurations and each has a side positioned in proximity to a mating side of an adjacent one of said diamond elements, the mating sides of said adjacent diamond elements each having a coating thereon of carbide forming metal which includes a relatively thin carbide layer adjacent to and contacting the surface of said coated side.

72. The diamond product of claim 71 wherein said mating sides of said adjacent polycrystalline diamond elements are in contact with one another and are bonded together by means of a metallurgical bond between the outer surfaces of said metal coating on said mating sides.

73. The diamond product of claim 72 wherein said carrier matrix extends between said mating sides of said adjacent diamond elements and wherein said adjacent diamond elements are bonded to one another by means of chemical bonds between the outer surfaces of said metal coatings on said mating sides and the portion of said carrier matrix extending therebetween.

74. The diamond product of claim 70 wherein said carbide forming metal is tungsten and each of said diamond elements has a surface positioned adjacent a facing surface of an adjacent one of said polycrystalline diamond elements, said tungsten coating on said elements extending over said facing surfaces, and further including means bonding said elements to said adjacent elements by means of strong chemical bonds between said facing surfaces of said elements.

75. The diamond product of claim 74 wherein said means bonding said elements to said adjacent elements includes a metallurgical bond between the outer surfaces of said tungsten coating on said facing surfaces.

76. The diamond product of claim 75 wherein said means bonding said elements to said adjacent elements including a portion of said carrier matrix extending between said facing surfaces of said adjacent elements, said tungsten coatings on facing surfaces being bonded to said extending portion of said carrier matrix by a strong chemical bond.

* * * * *